(12) United States Patent
Enomoto

(10) Patent No.: US 7,779,986 B2
(45) Date of Patent: Aug. 24, 2010

(54) TRANSFER SYSTEM

(75) Inventor: Masahiro Enomoto, Shiga (JP)

(73) Assignee: Daifuku Co., Ltd. (JP)

( * ) Notice: Subject to any disclaimer, the term of this patent is extended or adjusted under 35 U.S.C. 154(b) by 706 days.

(21) Appl. No.: 11/544,079

(22) Filed: Oct. 6, 2006

(65) Prior Publication Data

US 2007/0102261 A1    May 10, 2007

(30) Foreign Application Priority Data

Nov. 4, 2005    (JP)    ............... 2005-320240

(51) Int. Cl.
*B65G 47/84* (2006.01)
(52) U.S. Cl. ............... 198/370.02; 198/370.03
(58) Field of Classification Search ............ 198/372, 198/440, 370.2, 370.03
See application file for complete search history.

(56) References Cited

U.S. PATENT DOCUMENTS

| 3,361,247 | A |   | 1/1968  | Lauzon et al. ........... 198/38 |
| 4,971,190 | A | * | 11/1990 | Berends et al. ........ 198/370.02 |
| 5,333,715 | A | * | 8/1994  | Sapp ................... 198/370.02 |
| 6,283,271 | B1 |  | 9/2001  | van den Goor ......... 198/370.02 |

FOREIGN PATENT DOCUMENTS

| EP | 0 581 397 A1 | 2/1994 |
| JP | 03-205211 | 9/1991 |
| JP | 05-024619 | 2/1993 |
| JP | 06-032446 | 2/1994 |
| JP | 06-166425 | 6/1994 |
| JP | 2004-018265 | 1/2004 |
| NL | 9100847 | 12/1992 |

OTHER PUBLICATIONS

European Search Report from corresponding EP 06 01 9330—1 page.

* cited by examiner

*Primary Examiner*—Gene Crawford
*Assistant Examiner*—Kavel P Singh
(74) *Attorney, Agent, or Firm*—Kusner & Jaffe

(57) ABSTRACT

In a transfer system used for transferring articles that are conveyed on a main conveying path to branching conveying paths, change-over guiding sections of change-over units have an upper guiding body and a lower guiding body and the change-over action of the upper guiding body is caused by the motion force of an article side-push body in the direction of a main conveying path, and the change-over action of the lower guiding body is caused integrally in the second half of this change-over action. As a result, a sufficient change-over guiding length in the change-over unit can be ensured and change-over can be performed smoothly via both guiding bodies at all times.

6 Claims, 12 Drawing Sheets

F I G. 1 1
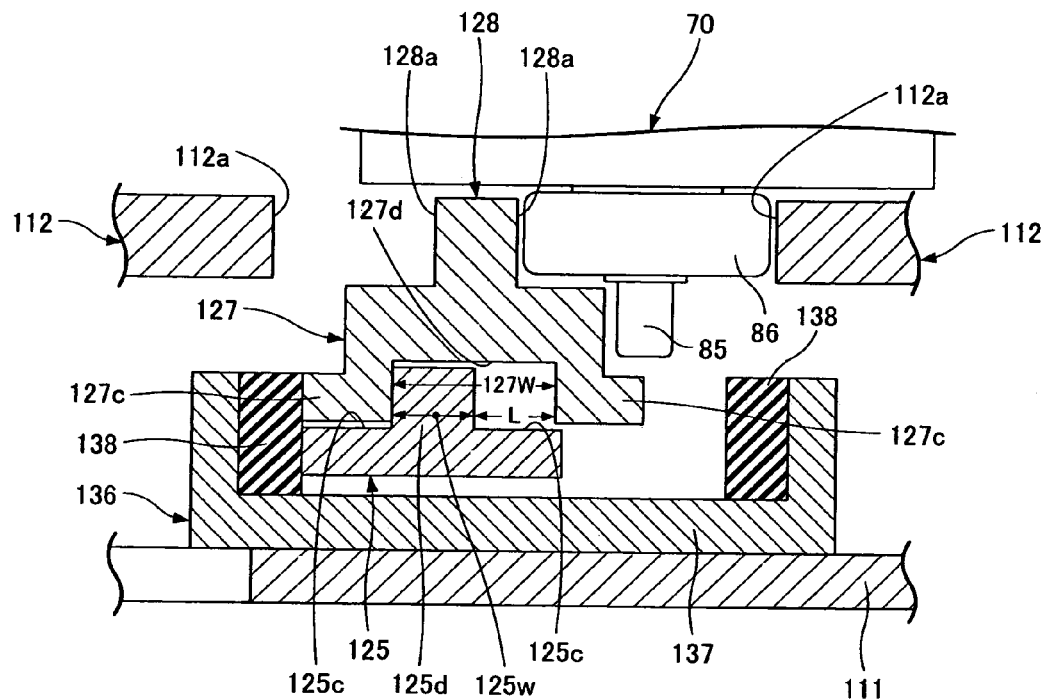
F I G. 1 2
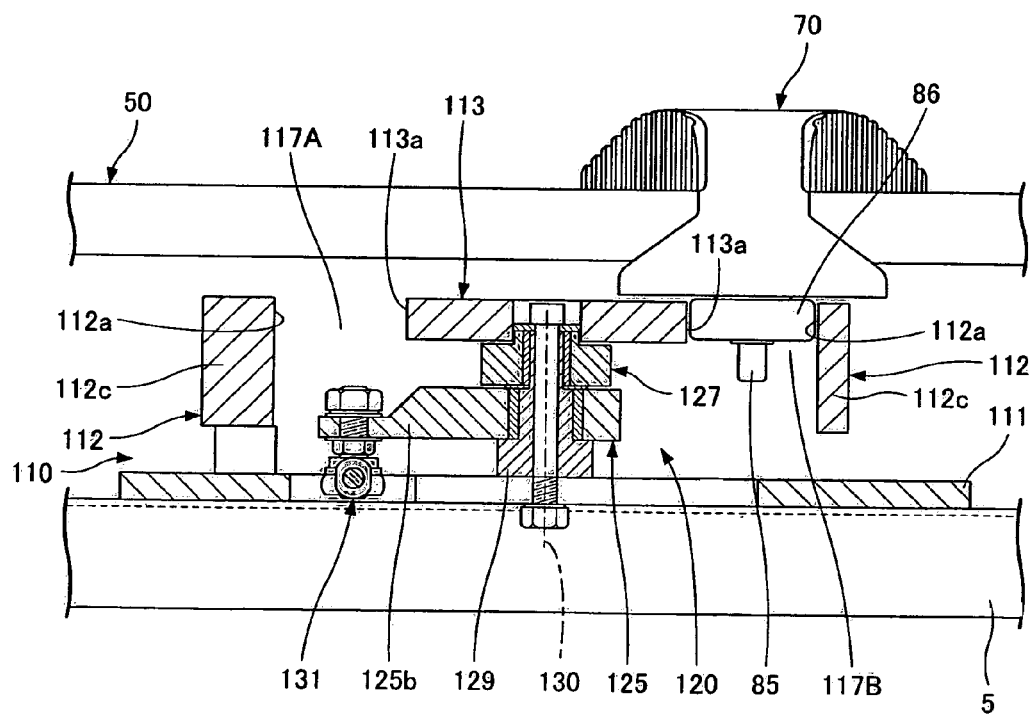

TRANSFER SYSTEM

FIELD OF THE INVENTION

The present invention relates to a transfer system suitable for transferring articles conveyed, for example, on a main conveying path to branch conveying paths provided outwardly on the lateral sides of the main conveying path.

BACKGROUND OF THE INVENTION

Japanese Patent Application Laid-open No. 6-32446 discloses a transfer system for transferring articles conveyed on a main conveying path to branch conveying paths. In this configuration, a guiding path of a pusher for moving the cargo transversely is provided and intersections in which the guiding path is crossed by an inclined path in a X-like fashion are provided. In the intersections, intersection transfer devices are provided for ensuring smooth transfer of the pusher in the intersection, and the intersection transfer device comprises a center cam, a link mechanism, and a joint lever. A second guiding section is mounted on a shaft hanging down from the pusher, and a first guiding section is formed at the lower end of the hanging shaft. In the intersection transfer device, the first guiding section abuts against the tilted surface, curved surface, and arch-like surface of the center cam, thereby rotating the center cam together with a pivot shaft. As a result, the joining lever is rotated reversely together with the pivot shaft via the link mechanism and fitted into a notched section of an intersection guide plate. The first guiding section is thereby guided from the intersection guide plate to the joining lever.

However, with the above-described conventional configuration, when the first guiding section comes into contact with the tilted surface from the arch-like surface of the center cam or is separated from the tilted surface, the center cam shifts and a state is assumed in which the joining lever is separated from the notched sections of the intersection guide plate, that is, a state where the joining lever bounces back against the intersection guiding plate, thereby making it impossible to conduct smooth guiding of the first guiding section with the joining lever.

SUMMARY OF THE INVENTION

An advantage of the present invention is a transfer system that performs smooth change-over at all times, while ensuring a sufficient change-over guiding length in change-over means.

In order to attain the above-described advantage, the present invention provides a transfer system comprising a pair of left and right endless rotary bodies provided along a main conveying path, a plurality of article support bodies mounted between the endless rotary bodies and having a direction perpendicular to the main conveying path as a lengthwise direction thereof, and an article side-push body fitted around the article support body and guided thereby, wherein a guided body is mounted on the underside of the article side-push body, a guiding device for guiding the guided body is installed on the side of a main frame. The guiding device comprises a pair of left and right inner movement guiding sections more inclined inwardly on the lower side and a pair of left and right outer movement guiding sections more inclined outwardly on the lower side and facing the finish ends of the inner movement guiding sections via change-over means, the change-over means has a merging guiding section for receiving the guided body from both inner movement guiding sections and a branching guiding section for guiding the guided body to both outer movement guiding sections, and a change-over guiding section for distributing the guided bodies from the merging guiding section to both branching guiding sections, wherein the change-over guiding section has an upper guiding body and a lower guiding body, and a motion force of the article side-push body in the direction of the main conveying path causes a change-over action of the upper guiding body and in the second half of the change-over action, integrally causes a change-over action of the lower guiding body.

With the above-described configuration of the present invention, a group of article support bodies are moved on the main conveying path by the movement of both endless rotary bodies, thereby making it possible to convey the articles supplied onto the groups of the article support bodies at the initial end section on the main conveying path. After the guided bodies have been guided and moved inwardly by the inner movement guiding sections, they move into the outer movement guiding section via the change-over means and are guided and moved outwardly by the outer movement guiding section. As a result, the article side-push body is moved in the lengthwise direction of the article support body and pushes the article sideways, thereby making it possible to deliver the article outwardly on the side of the main conveying path.

In this case, the change-over action of the change-over guiding section can be performed automatically by using the motion force of the article support body. Thus, for example, when a guided body is guided and moved inwardly by an inner movement guiding section on one side (on the left or right side) and then moves to the outer movement guiding section on the other side via the change-over guiding section, the change-over guiding section changes over the upper guiding body and lower guiding body to one side. Therefore, the guided body from the inner movement guiding section on one side moves to the outer movement guiding section on the other side via the merging guiding section, upper guiding body, lower guiding body, and branching guiding section on the other side, whereby the group of the article side-push bodies can be transferred across from one side to the other side in the main conveying path.

Furthermore, where the guided body is changed over so as to be guided to the inner movement guiding section on the other side, when the guided body at the rearmost end from the inner movement guiding section on one side reaches a portion of the lower guiding body, the guided body at the frontmost end from the inner movement guiding section on the other side reaches the merging guiding section, and the upper guiding body can be changed over to the other side by the motion force of the article support body from this state. In the second half of the change-over action of the upper guiding body, the lower guiding body can be changed over integrally. Therefore, the guided body at the frontmost end from the inner movement guiding section on the other side moves to the outer movement guiding section on one side via the merging guiding section, upper guiding section, lower guiding section, and branching guiding section on one side, whereby the group of the article side-push bodies can be transferred across from the other side to one side in the main conveying path.

As a result, the change-over via the upper guiding body and lower guiding body can be performed smoothly at all times, while ensuring a sufficient change-over guiding length in the change-over means with the upper guiding body and lower guiding body.

In the preferred first embodiment of the transfer system of the present embodiment, when the guided body of a leading article side-push body is guided by the lower guiding body, the following article side-push body assumes a start position in which a change-over action of the upper guiding body is caused.

According to this first embodiment, only the upper guiding body swings and the lower guiding body does not swing in the first half of the change-over action of the upper guiding body. Therefore, the lower guiding body does not swing even when the upper guiding body swings, thereby making it possible to guide the guided body with the lower guiding body smoothly and without any impediment.

With the second preferred embodiment of the transfer system of the present invention, the change-over guiding section comprises a cam body that can swing to the left and right about a spindle center on the upper side that is positioned in the merging guiding section, an upper guiding body and a lower guiding body that can swing to the left and right about the spindle center located on the lower side, and a swinging response movement mechanism provided between the cam body and the upper guiding body, wherein the cam body is caused to swing to the left and right by the motion force of the article side-push body and the upper guiding body changes over in response to the left-right swinging of the cam body.

According to the second embodiment, the change-over action of the change-over guiding section can be performed automatically by using the motion force of the article side-push body. Thus, for example, when a guided body is guided and moved inwardly by an inner movement guiding section on one side and then moves to the outer movement guiding section on the other side via the change-over guiding section, the change-over guiding section causes the cam body to swing to the other side about the spindle center on the upper side, and the upper guiding section and lower guiding section are caused to swing to one side about the spindle center on the lower side. Therefore, when the guided body from the inner movement guiding section on one side moves to the outer movement guiding section on the other side via the merging guiding section, upper guiding body, lower guiding body, and branching guiding section on the other side, the motion force of the article side-push body can be passed through without acting upon the cam body, thereby making it possible to maintain the posture of the upper guiding body and lower guiding body.

Furthermore, where the guided body is changed over so as to be guided to the inner movement guiding section on the other side, when the guided body at the rearmost end from the inner movement guiding section on one side reaches a portion of the lower guiding body, the article side-push body at the frontmost end from the inner movement guiding section on the other side reaches the merging guiding section and can be in a position in close proximity to (abutting against) the cam body. If it further moves from this state, the motion force of the article side-push body acts upon the cam body and the cam body is pushed by this motion force to one side and swung to one side about the spindle center on the upper side. This swinging of the cam body is transferred to the upper guiding body via the swinging movement response mechanism, and the upper guiding body can swing to the outer side about the spindle center on the lower side. Because only the upper guiding body swings and the lower guiding body does not swing in the first half of the changeover action of the upper guiding body, the lower guiding body does not swing to the other side even when the upper guiding body swings to the other side, thereby making it possible to conduct the guidance of the guided body at the rearmost end with the lower guiding body smoothly and without any impediment.

The motion force of the article sidewise body, which has moved further, pushes the cam body continuously to one side and can swing the upper guiding body further to the other side about the spindle center on the lower side via the swinging movement response mechanism. In the second half of the change-over action of the upper guiding body, that is, in the subsequent interval, the upper guiding body and lower guiding body can swing integrally about the spindle center on the lower side.

In the third preferred embodiment of the transfer system of the present invention, a support shaft is provided vertically on the underside of the article side-push body, the guided body is mounted on this support shaft, and the change-over action of the upper guiding body is caused by a motion force of the guided body that has moved to the merging guiding section.

According to the third embodiment, the change-over action of the change-over section can be performed automatically and smoothly by using the motion force of the guided body.

In the fourth preferred embodiment of the transfer system of the present invention, a support shaft is provided vertically on the underside of the article side-push body, the guided body is mounted on this support shaft, and the cam body is caused to swing to the left and right by the motion force of the moving support shaft.

According to the fourth embodiment, when the guided body from the inner movement guiding section on one side is moved to the outer movement guiding section on the other side via the merging guiding section, upper guiding body, lower guiding body, and branching guiding section on the other side, support shaft of the guided body moving a portion of the cam body can be passed through without coming into contact with the can body, thereby making it possible to maintain the posture of the upper guiding body and lower guiding body. Furthermore, where the guided body is changed over so as to be guided to the inner movement guiding section on the other side, when the guided body at the rearmost end from the inner movement guiding section on the other side reaches a portion of the lower guiding body, the guided body at the frontmost end from the inner movement guiding section on the other side reaches the merging guiding section and the support shaft thereof can be in a position in close proximity to (abutting against) the cam body. If it further moves from this state, the support shaft comes into contact with the cam body and the cam body can be pushed by the motion force of the support shaft to one side and swings to one side about the spindle center on the upper side. As a result, the change-over action of the change-over guiding section can be performed automatically and smoothly by using the motion force of the support shaft.

In the fifth preferred embodiment of the transfer system of the present invention, when the moving support shaft reaches the finish end section of the cam body, the guided body mounted on the support shaft faces the upper guiding body.

According to the fifth embodiment, the guided body prevents the cam body from being shifted by an impact such as occurring when the support shaft is separated from the cam body, and thereby prevents the upper guiding body from displacing. Thus, it is possible to move the guided body smoothly at all times.

BRIEF DESCRIPTION OF THE DRAWINGS

FIG. 11 is an enlarged vertical front sectional view of a main part of a guiding body portion of the upper change-over means in the transfer system;

FIG. 12 is a vertical front sectional view of a branching guiding section of the upper change-over means in the transfer system;

DESCRIPTION OF THE PREFERRED EMBODIMENTS

Figure 1:
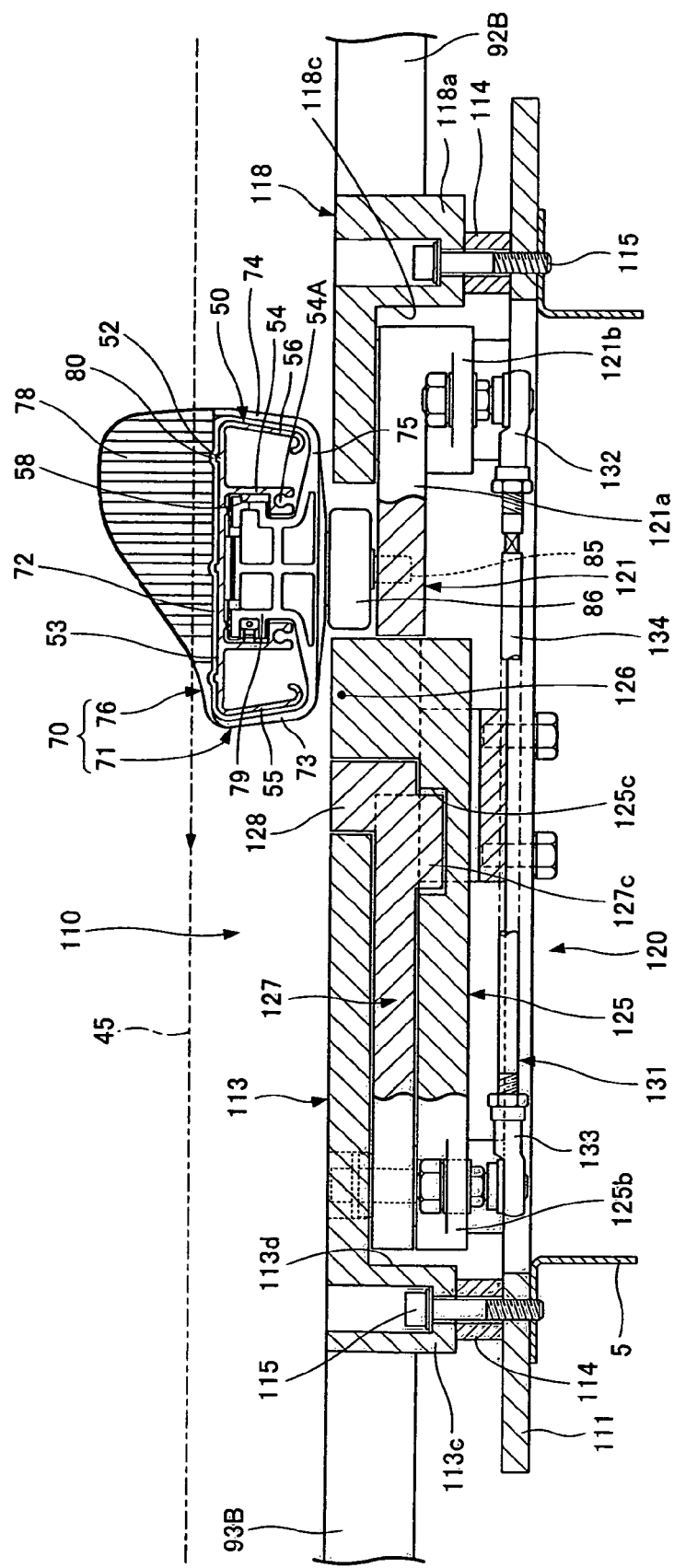
FIG. 1 is a partially cut-out side view of a portion of upper change-over means in a transfer system, illustrating an embodiment of the present invention.

The present invention will be described below with reference to the appended drawings.

In FIG. 2 to FIG. 8, the reference numeral 1 stands for a main frame comprising pairs of upper and lower frame members 10, 20 installed on both sides, an intermediate frame member 2 linking the upper-lower and left-right frame members 10, 20, and a group of leg bodies 3 provided in a connected arrangement below the lower frame members 20, wherein the intermediate frame member 2 comprises a vertical linking member 4 and a transverse linking member 5.

The upper frame member 10 is formed from an aluminum molding and has a rectangular cross section. An upward rising section 11 is formed in the central section thereof, a notch-shaped step section 12 is formed on the outer side of the top part of the rising section 11, and a lubricating oil receiving section 13 in the form of an upward groove is formed on the inner side of the top part of the rising section 11. Furthermore, in the upper frame member 10, an outward dovetail groove 14 is formed in the position of the rising section 11, and an upward dovetail groove 15 is formed in the position of the step section 12 on the outer side. Furthermore, an inner downward dovetail groove 16 and an outer downward dovetail groove 17 are formed at the lower end. In the upper frame member 10, a forward guiding rail section 18 protrudes inwardly from the position slightly below the lubricating oil receiving section 13 on the inner side, and this forward guiding rail section 18 serves to support and guide article support bodies (described hereinbelow). A downward dovetail groove 19 is formed in a portion of the forward guiding rail section 18. The lubricating oil receiving section 13, dovetail grooves 14-17, 19, and forward guiding rail section 18 are formed along the entire length in the lengthwise direction when the upper frame member 10 is shaped. The above-described components denoted by the reference symbols 11-19 constitute an example of the upper frame member 10.

The lower frame member 20 is formed from an aluminum molding and has a rectangular cross section. An inner upward dovetail groove 21 and an outer upward dovetail groove 22 are formed in the upper end of the lower frame member, and an inner downward dovetail groove 23 and an outer downward dovetail groove 24 are formed in the lower end thereof. Furthermore, in the lower frame member 20, a lubricating oil receiving section 25 in the form of an upward groove is formed on the inner side of the intermediate section thereof, a return guiding rail section 26 protrudes inwardly, and this return guiding rail section 26 serves to support and guide the article support bodies. A downward dovetail groove 27 is formed in a portion of the return guiding rail section 26. A top end extension section 29 is formed integrally so as to be positioned above a step section 28 formed by the return guiding rail section 26 and the like; as a result, a transverse guiding surface is formed by the inner surface of the top end extension section 29. The dovetail grooves 21-24, 27, return guiding rail section 26, and top end extension section 29 are formed along the entire length in the lengthwise direction when the lower frame member 20 is shaped. The above-described components denoted by the reference symbols 21-29 constitute an example of the upper frame member 20.

The intermediate frame member 2 is integrated with the upper frame member 10 by positioning a plate-like nut body 6 in both downward dovetail grooves 16, 17 of the upper frame member 10, screwing a bolt body 7 that was passed from below through the vertical linking member 4 and transverse linking member 5 of the intermediate frame member 2, and tightening to the bolt body 7 to the nut body 6. Furthermore, by using both upward dovetail grooves 21, 22 of the lower frame member 20, the intermediate frame member is integrated with the lower frame member 20 by using the nut body 6 and bolt body 7 in the same manner as described below. A plurality of such intermediate frame members 2 are installed with the predetermined spacing in the lengthwise direction of both frame members 10, 20. Furthermore, the leg body 3 is linked to the lower frame member 20 by the nut body 6 and bolt body 7 by using the downward dovetail grooves 23, 24 of the lower frame member 20.

A driven shaft 30 for the left-right direction is rotatably installed at the start end section of the main frame 1 configured in the above-described manner, and a drive shaft 31 for the left-right direction is rotatably installed at the finish end section. Here, the driven shaft 30 and drive shaft 31 are rotatably supported via the respective bearing devices 33 on a pair of left and right support members 32 installed between the two frame members 10, 20. A drive device 34 that is operably linked to the drive shaft 31 comprises an electric motor 35 and a reducing mechanism 36 integrated therewith; the output section of the reducing mechanism 36 is linked to the drive shaft 31.

Endless chains (an example of endless rotary bodies) 40 are provided via sprockets (an example of a ring body) 38, 39 between mutually opposing sections at both ends of the driven shaft 30 and drive shaft 31. Here, the sprockets 38, 39 are installed on the inner side of the support member 32 and linked to the driven shaft 30 or drive shaft 31. Furthermore, the endless chains 40 comprise links 41 and link pins 42. On the forward side, the endless chain is located above the lubricating oil receiving section 13, and on the return side, it is positioned inside a step section 28 above the lubricating oil receiving section 25. A plurality of article support bodies 50 are mounted between the left and right endless chains 40. Of the group of the link pins 42, elongated link pins 42 formed by causing the link pins installed with the predetermined pitch to protrude inwardly are used for mounding the article support bodies 50.

The article support bodies 50 are installed, as shown in FIG. 1 to FIG. 5, so that the direction perpendicular to a main conveying path 45 serving as a movement direction of both endless chains 40 is a lengthwise direction 51. The article support body 50 is configured to have a formed rail shape by a flat-shaped article loading plate section 53 in which convex sections 52 provided along the lengthwise direction 51 on the upper surface are formed in three lines (a plurality of lines) in the direction of the main conveying path 45, leg plate sections 54 provided along the lengthwise direction 51 and installed as a pair in the direction of the main conveying path 45 from the intermediate section of the lower surface (intermediate section of the back surface) of the article loading plate section 53, a front plate section 55 extending downward and rearward from the front end of the article loading plate section 53, and a rear plate section 56 extending downward and forward from the rear end of the article loading plate section 53. In such a configuration, the lower ends of both leg plate sections 54 are formed as thick sections by protruding inwardly, whereby a groove-shaped guide section 58 opened on the mutually opposing sides is formed between the two leg plate sections 54 and between the intermediate sections on the lower surfaces of the article loading plate sections 53. A groove-shaped threaded section 54A, which is open downward, is formed in the lower ends of both leg plate sections 54. The above-described components denoted by the reference symbols 52-58 constitute an example of the article support body 50.

Side brackets 61 are mounted, for example, by an insertion joint on both ends in the lengthwise direction 51 of the article support bodies 50 configured in the above-described manner. The side brackets 61 are made from steel, and plate-shaped insertion sections protruding inwardly are provided in two locations, front and rear, in the upper section of the inner surface side of a main body section 62 elongated in the direction of the main conveying path 45. An inwardly protruding piece is formed by bending in the lower section in the middle part of the main body section 62. Furthermore, a tubular body 63 protruding outwardly is mounted by welding in one location of the front section on the outer surface side of the side bracket 61.

The side brackets 61 formed in the above-described manner can be mounted at both ends of the article support body 50 by inserting a pair of insertion sections into a pair (front and rear) hollow sections formed by the article carrying plate section 53 and the front plate section 55 or rear plate section 56 in the article support body 50 and then joining by screwing a bolt body inserted from the outside into any of the threaded sections 54A. A protruding portion of the elongated link pin 42 extending from the side of the endless chain 40 is joined by inserting from the outside into an insertion hole provided in the tubular body 63, whereby both ends of the article support body 50 can be linked to the endless chain 40 via the respective side bracket 61 and a plurality of article support bodies 50 can be mounted between a pair of left and right endless chains 40.

Rotary bodies (an example of guided members which comprise a bearing system or a roller system) 64 with an outer peripheral section comprising urethane are externally fitted on the tubular body 63, and those rotary bodies 64 are supported and guided by the upward support surfaces of both guiding rail sections 18, 26 of the main frame 1. Side rollers (an example of guided members) 65 with an outer peripheral section comprising urethane are rotatably provided via a vertical shaft 66 at the protruding piece of the main body section 62, and those side rollers 65 are guided by a transverse guiding surface of the forward guiding rail section 18.

An article side-push body 70 that is fit externally on the article support body 50 and can be moved and guided in the lengthwise direction 51 is provided at each article support body 50; those article side-push bodies 70 are composed of the lower rectangular tubular portion 71 and an upper side-push operation section 76. Thus, the rectangular tubular section 71 is formed from a flat upper plate member 72 facing from the upper side the article loading plate section 53, a front plate member 73 facing from the outside the front plate section 55 by extending downward and rearward from the front end of the upper plate member 72, a rear plate member 74 facing from the outside the rear plate section 56 by extending downward and forward from the rear end of the upper plate member 72, and a bottom plate member 75 positioned between the lower ends of the front plate member 73 and lower plate member 74.

A side-push action section 76 is provided on the upper surface side of (above) the upper plate member 72. Thus, the side-push action section 76 is formed from a top plate member 77 covering the upper side of the upper plate member 72 and a side-push abutment member 78 that is detachably mounted on the portions of the sidewise inclined surfaces on both sides in the top plate member 77. Here, the sidewise inclined surface is formed to have a trapezoidal plate shape as a whole with an inclination angle θ of 30 degrees in the planar view thereof. The side-push abutment member 78 is made, for example, from a rubber plate or the like, and the side-push abutment surface thereof is formed to have peaks and valleys in the planar view thereof.

A fitting section 79 in the form of an upward protrusion fitting between the two leg plate sections 54 is installed on the upper surface side of the bottom plate member 75, whereby the article side-push body 70 is configured to be guided between the guiding sections 58 in the article support body 50 via the fitting section 79. Furthermore, three concave groove sections 80 facing from above the convex section 52 formed in the article carrying plate section 53 of the article support body 50 are formed in the lower surface of the upper plate member 72. The above-described components denoted by the reference symbols 71-80 constitute an example of the article side-push body 70. This article side-push body 70 is formed integrally from a synthetic resin, with the exception of the side-push abutment member 78.

A guided body is mounted by using the fitting section 79 on the underside of the article side-push body 70. Thus, a roller shaft (an example of the support shaft) 85 is provided in a hanging condition from the central section of the fitting section 79 by supporting the upper section thereof by embedded molding and a guide roller (an example of the guided body) 86 is rotatably mounted on the protruding lower section of the roller shaft 85, thereby positioning the guide roller 86 outwardly of the rear surface of the article side-push body 70. The roller shaft 85 is configured so as to protrude downward through the predetermined length with respect to the guide roller 86.

As shown in FIG. 2 to FIG. 8, a forward guiding device (an example of the guiding device) 90 for guiding the guide roller 86 is installed at the upper transverse linking member 5 in the intermediate frame member 2 of the main frame 1, and a return guiding device 96 is installed at the lower transverse linking member 5. Upper change-over means 110 on the forward side and lower change-over means 105 on the return side are installed in the central branching section, and a pair of left and right distribution means 106A, 106B are installed close to the start end on the forward side.

The forward guiding device 90 comprises start end guiding sections 91A, 91B provided as a left-right pair on both sides of the start end section, a pair of left and right inner movement guiding sections 92A, 92B inclined inwardly on the lower side and facing via the distribution means 106A, 106B the finish ends of those start end guiding sections 91A, 91B, a pair of left and right outer movement guiding sections 93A, 93B inclined outwardly on the lower side and facing via the upper change-over means 110 the finish ends of those inner movement guiding sections 92A, 92B, and a pair of left and right finish end guiding sections 94A, 94B installed opposite the finish ends of the outer movement guiding sections 93A, 93B.

The return guiding device 96 comprises a pair of left and right inner movement guiding sections 97A, 97B inclined inwardly on the lower side and a pair of left and right outer movement guiding sections 98A, 98B inclined outwardly on the lower side and facing via the lower change-over means 105 the finish ends of those inner movement guiding sections 97A, 97B.

The start end guiding sections 91A, 91B and finish end guiding sections 94A, 94B of the forward guiding device 90 and the right outer movement guiding sections 98A, 98B of the return guiding device 96 comprise a bracket 100 fixed to the upper transverse linking member 5 and one guiding body 101 or a pair of such bodied mounted so as to be opposite the bracket 100. Here, the guiding body 101 is made from an aluminum extruded or drawn molded body or a resin molding, and a guide roller 86 is positioned between the guiding bodies 101 or between the opposing surfaces of the outer movement guiding sections 93A, 93B or 98A, 98B. Furthermore, the guiding body 101 in the finish end guiding sections 94A, 94B may have a configuration in which a resin molded member is provided on the guiding side of the guide roller 86 or a configuration in which the entire guiding body 101 is formed from a resin molded member.

Furthermore, the inner movement guiding sections 92A, 92B or outer movement guiding sections 93A, 93B of the forward guiding device 90 and the inner movement guiding sections 97A, 97B of the return guiding device 96 are configured by fixing the guiding bodies 101 directly to the lower transverse linking member 5, and the guide rollers 86 are guided by the side surfaces of the guiding bodies 101. Furthermore, reverse guiding bodies 107A, 107B, 108A, 108B that allow the guide rollers 86 to mate are mounted on the portions of the two shafts 30, 31 so that guiding of the guide rollers 86 be carried out in the start and finish reverse sections.

As shown in FIG. 1 and FIGS. 9 to 13, the upper change-over means 110 has a merging guiding section 116 for receiving the guide rollers 86 from both inner movement guide sections 92A, 92B, branching guiding sections 117A, 117B for guiding the guide rollers 86 to both outer movement guiding sections 93A, 93B, and a change-over guiding section 120 for distributing the guide rollers 86 from the merging guiding section 116 to both branching guiding sections 117A, 117B.

A base plate body 111 in the form of a rectangular ring, which serves as the main body of the upper change-over means 110, is placed on and fixed to the transverse linking member 5, and members for forming the merging guiding section 116 or branching guiding sections 117A, 117B are fixed on the base plate body 111. Thus, side section forming members 112 formed to have a peak shape in the planar view thereof and having a rear inclined surface 112a and a front inclined surface 112b are installed on the left and right side so that the peak apices thereof face each other, and a rear section forming member 113 having a triangular shape in the planar view thereof is installed so that the left and right inclined surfaces 113a thereof are opposite the rear inclined surfaces 112a. In this case, the outer side portion of the side section forming members 112 and the rear end portion of the rear section forming member 113 are formed as thick sections 112c, 113c protruding downward, and those thick sections 112c, 113c are fixed to the base plate body 111 via a spacer 114 and a fixing tool 115.

The inner portion of the thick section 112c in the side section forming member 112 and the upper portion of the thick section 113c in the rear section forming member 113 are formed in the notch-shaped step sections 112d, 113d. Furthermore, a step-shaped receiving surface 112e in the form of a straight line is formed in the peak apex portion of the side section forming member 112.

As a result, the merging guiding section 116 in the form of V-shaped groups is formed in the front inclined surface 112b of the side section forming member 112, and the branching guiding surfaces 117A, 117B in the form of straight grooves are formed in a left-right distributed state between the rear section inclined surface 112a of the side section forming member 112 and the left-right inclined surfaces 113a of the rear section forming member 113. At this time, the branching guiding surfaces 117A, 117B in the form of straight grooves are configured so that the guide rollers 86 can be guided.

A regulating member 118 in the form of an ellipse in the planar view thereof is disposed in the central portion of the merging guiding section 116, the upper portion of the regulating member 118 is formed in a thick section 118a protruding downwardly, and the thick section 118a is fixed to the base plate body 111 via the spacer 114 and the fixing tool 115. Further, the configuration is such that the guide rollers 86 are guided between the left and right regulating surfaces (elliptical side surfaces) 118b of the regulating member 118 and the front inclined surface 112b. The lower portion of the thick section 118a in the regulating member 118 is formed in the notch-shaped step section 118c.

The change-over guiding section 120 comprises a cam body 121 that is positioned at the merging guiding section 116 and is free to swing to the left and right about a spindle center 123 on the upper side, an upper guiding body 126 and a lower guiding body 128 that are free to swing to the left and right about a spindle center 130 on the lower side, and a swinging movement response mechanism 131 provided between the cam body 121 and the upper guiding body 126.

Thus, the cam body 121 is disposed so that the upper side portion (front half portion) thereof is positioned in a step 118c of the regulating member 118 and configured so that it can swing to the left and right about the spindle center 123 on the upper side, with the upper side portion of the cam body being externally fitted on a support shaft body 122 fixed to the base plate body 111. Furthermore, both side surface of the cam body 121 are formed by a cam surface 121a, and the cam surface 121a is positioned below the regulating surface 118b of the regulating member 118, which guides the guide rollers 86, and is configured so that the roller shafts 85 are brought into contact therewith.

The cam surface 121a is formed so that when the cam body 121 swings to the left and right, the roller shaft 85 that moved to the side opposite to the swinging side passes through without coming into contact with the cam surface 121a, whereas the roller shaft 85 that moved to the swinging side comes into contact with the cam surface 121a and pushes it to the opposite side. Thus, the cam body 121 is configured to swing to the left and right around the spindle center 123 on the upper side under the effect of the motion force of the roller shaft 85 that has moved. An arm section 121b extending at a right angle sidewise (left side) is provided integrally from the lower side on the upper side portion of the cam body 121.

A long link body 125 and a short link body 127 are disposed in an overlapping state, with the long link body 125 being below, inside the step section 113d of the rear section forming member 113. Those link bodies 125, 127 are configured so that the lower side portions thereof are fit externally on the common support shaft body 129 fixed on the base plate body 111, thereby allowing the link bodied to swing individually to the left and right about the spindle center 130 on the lower side. The upper end portion of the support shaft body 129 is mated with the rear section forming member 113.

An upper guiding body 126 positioned in front (above) the rear section forming member 113 is formed integrally in the raised state thereof with the front end portion of the long link body 125. The upper guiding body 126 has a trapezoidal shape with a short front end side in the planar view thereof, and the upper guiding surfaces 126a are formed by both side surfaces thereof. The upper guiding body 126 swings (change-over action) to the left and right about the long spindle center 130 on the lower side together with the long link 125 and is formed so that when any one of the upper guiding surfaces 126a comes into contact with the step-shaped receiving surface 112e of the side section forming member 112, the other (opposite) upper guiding surface 126a is linearly contiguous to one (abutting) front inclined surface 112b.

Furthermore, an arm section 125b extending at a right angle sidewise (to the left) is provided integrally in a connected arrangement from the lower section in the lower side portion of the long link body 125. The free ends of the arm section 125b and the above-described arm section 121b of the cam body 121 are linked by the swinging movement response mechanism 131. Thus, the swinging movement response mechanism 131 is configured so that the movement response length thereof can be adjusted by arm-shaped bodies 132, 133 linked so that they are free to swing with respect to each other via vertical shaft bodies or the like to the free ends of the arm sections 121b, 125b and a rod-shaped body 134 screwed between the arm-shaped bodies 132, 133. As a result, under the effect of the motion force of the roller shaft 85 that moved to the merging guiding section 116, the cam body 121 can swing to the left and right, and the upper guiding body 126 performs a change-over action in response to the left-right swinging movement of the cam body 121 via the swinging movement response mechanism 131.

A lower guiding body 128 positioned in front of (above) the rear section forming member 113 and behind (below) the upper guiding body 126 is formed integrally in a rising condition at the front end portion of the short link body 127. The lower guiding body 128 has a trapezoidal shape with the short front end side in the planar view thereof, the front end surface thereof is in a close proximity to the rear end surface of the upper guiding body 126, and the lower guiding surfaces 128a are formed by the two side surfaces. Furthermore, the lower guiding body 128 swings to the left and right about the spindle center 130 on the lower side together with the short link body 127, and the left-right swinging (change-over action) of the lower guiding body 128 is performed integrally in the second half of the change-over action of the upper guiding body 126.

Thus, concave sections 125c opened upward and sidewise are formed at both sides in the intermediate portion of the long link body 125, and a stopper section 125d is formed by the remaining section between the two concave sections 125c. Furthermore, convex sections 127c protruding downward and sidewise are formed at both sides in the front end portion of the short link body 127, and a mating section 127d for mating with the stopper section 125d is formed between the inner surfaces of the convex sections 127c. Here, a width 125w of the stopper section is set shorter by a set length L than a width 127w of the mating section, which is the distance between the inner surfaces of the convex sections 127c, that is, "127w–125w=L". As a result, in the first half of the change-over action of the upper guiding body 126, only the long link body 125 swings through the set length L, and then in the second half of the change-over action of the upper guiding body 126 after the stopper section 125d has abutted against the convex section 127c, the long link body 125 and the short link body 127 swing integrally.

When any one upper guiding surface 126a comes into contact with the step-shaped receiving surface 112e of the side section forming member 112 as a result of this integral swinging, the other (opposite) lower guiding surface 128a of the lower guiding body 128 becomes linearly contiguous to the other (opposite) upper guiding surface 126a of the upper guiding body 126, and this lower guiding surface 128a becomes linearly contiguous to the inclined surface 113a of the rear section forming member 113.

Figure 13:
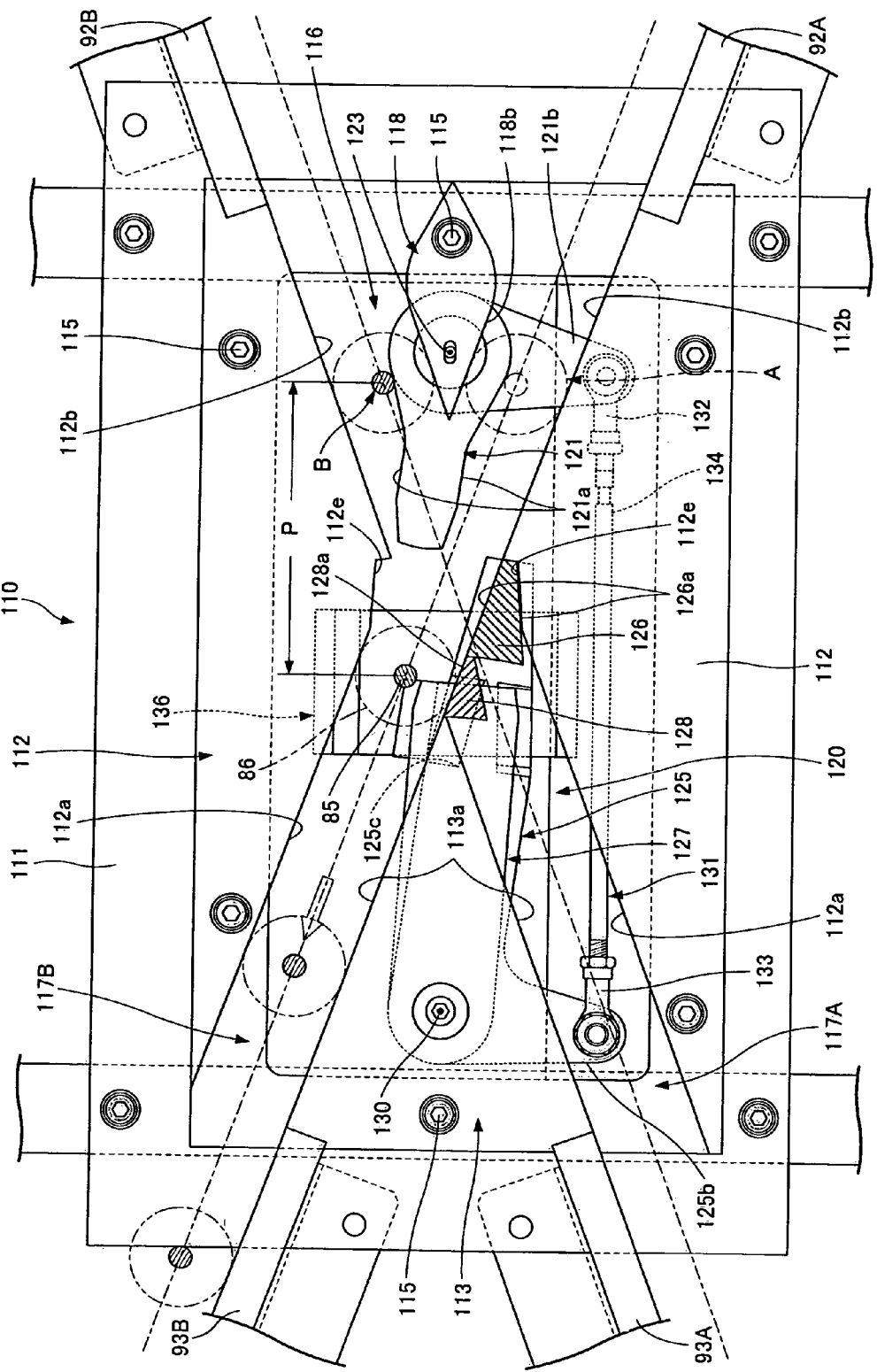
FIG. 13 is a partially cut-out plan view of the upper change-over means in the transfer system, illustrating a state immediately before the change-over of the means.

Furthermore, a guided body pitch P equivalent to the pitch of article support bodies 50 in the direction of the main conveying path 45, the positions or shape (length) of the upper guiding body 126 and lower guiding body 128, and the position or shape (length) of the cam body 121 are set so that when the leading guide roller 86 is guided by the lower guiding body 128, the following guide roller 86 assumes a start position for a change-over action of the upper guiding body 126. Thus, as shown in FIG. 13, the configuration is such that when the leading guide roller 86 is guided by the lower guiding body 128, the roller shaft 85 supporting the following guide roller 86 comes into contact with the cam surface 121a of the cam body 121 somewhat below the spindle center 123 on the upper side.

Furthermore, the relative positions of the cam body 121 and upper guiding body 126 and the diameter of the guide rollers 86 are set so that when the moving roller shaft 85 reaches the finish end portion of the cam body 121, that is, the finish end portion of the cam surface 121a, the guide roller 86 mounted on this roller shaft 85 faces the upper guiding surface 126a of the upper guiding body 126.

Buffer control means 136 for reducing the impacts (noise) and provided for accurate performance of the change-over swinging of the upper guiding body 126 and lower guiding body 128 is provided in the start end portions of the branching guiding sections 117A, 117B. Thus, a holding member 137 in the form of an U-shaped frame is fixed to the base plate 111, and buffer members 138 made from a rubber or the like are mounted on the inner surface of the left and right rising plate sections in the holding member 137. The configuration is such that during the change-over swinging, both side surfaces of the long link body 125 or the convex section 127c of the short link body 127 come into contact with the buffer member 138.

Figure 2:
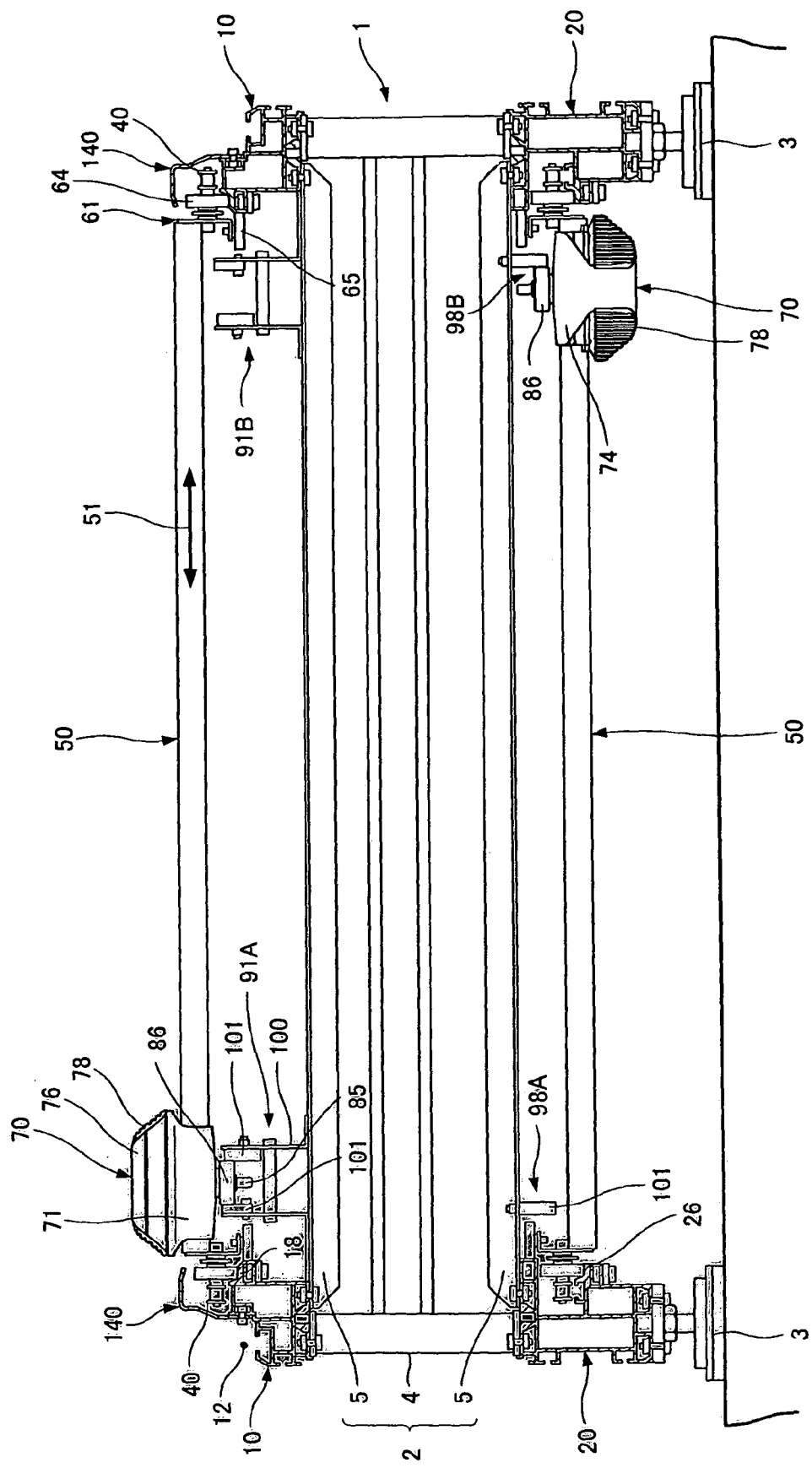
FIG. 2 is a partially cut-out front view of the transfer system.
Figure 3:
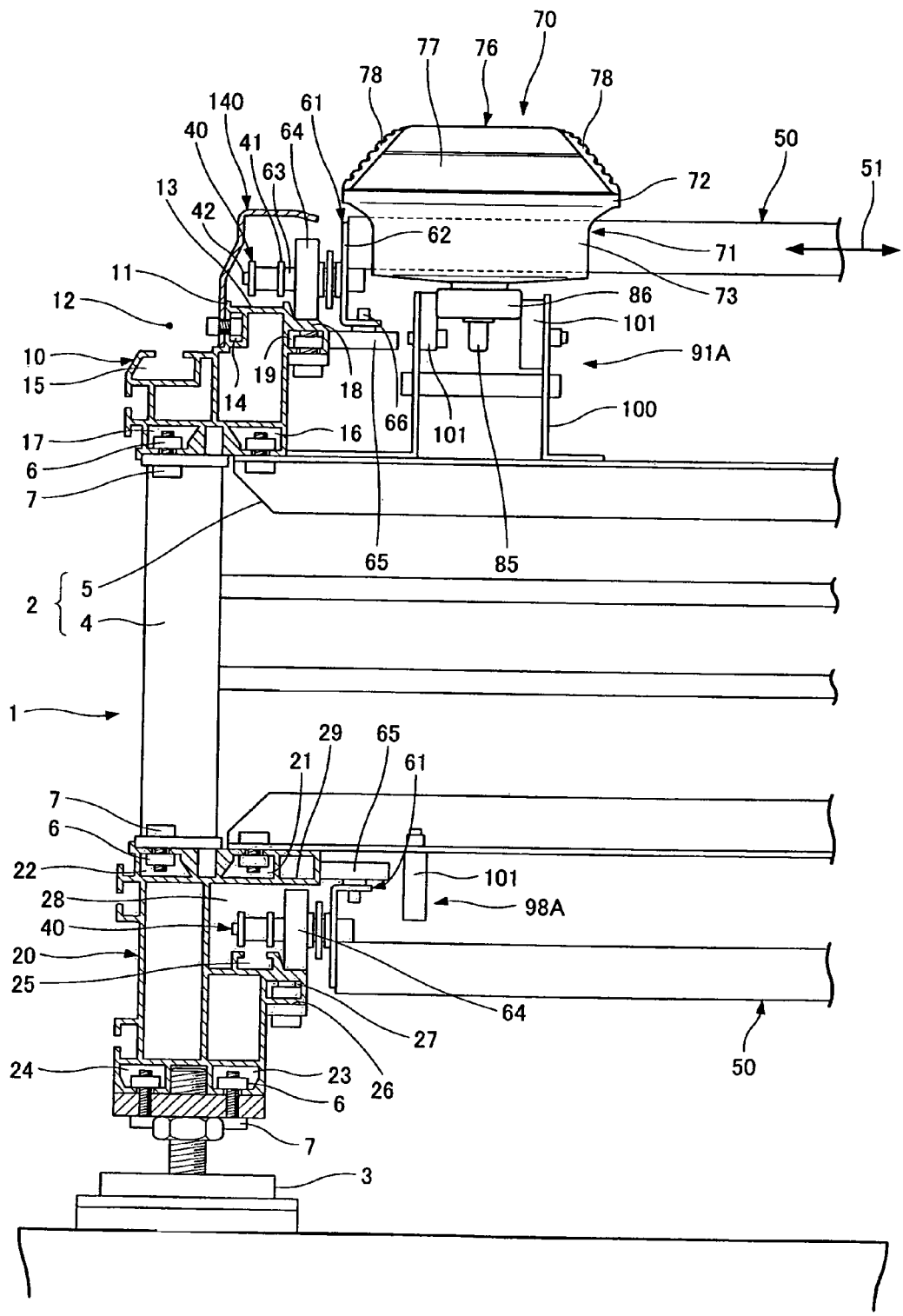
FIG. 3 is a partially cut-out front view of a main portion of the transfer system.

As shown in FIG. 2 and FIG. 3, a cover body (chain cover) 140 serving to cover the endless chains 40 or rotary bodies 70 from above is disposed in the portion where the endless chains 40 were installed and the forward guiding rail section 18 was formed at the upper frame member 10 (upper section of the main frame 1). This cover body 140 is formed as a shaped rail with a cross section in the form of inverted L by a side plate section and an upper plate section that is bent at a right angle inwardly from the top section of the side plate section. Furthermore, the cover body 140 can be detachably fixed to the rising section 11 of the upper frame member 10 by screwing a bolt body passing from the outside in the lower end portion of the side plate section into a nut body positioned in advance in the outward groove section 14, after the side plate section has been abutted from the outside against the rising section 11.

Figure 4:
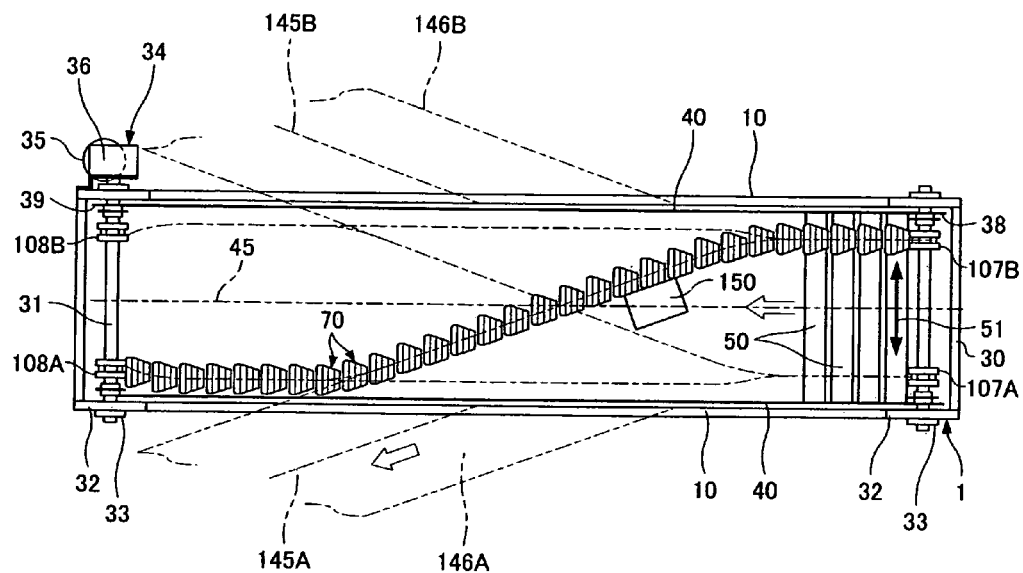
FIG. 4 is a schematic plan view of the transfer system.
Figure 5:
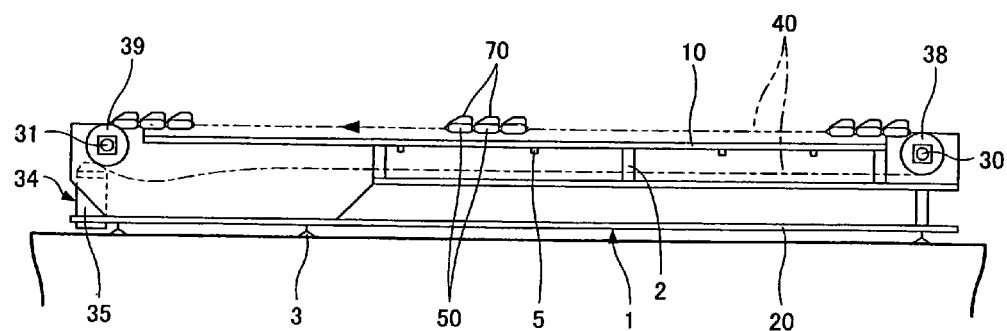
FIG. 5 is a schematic side view of the transfer system.
Figure 6:
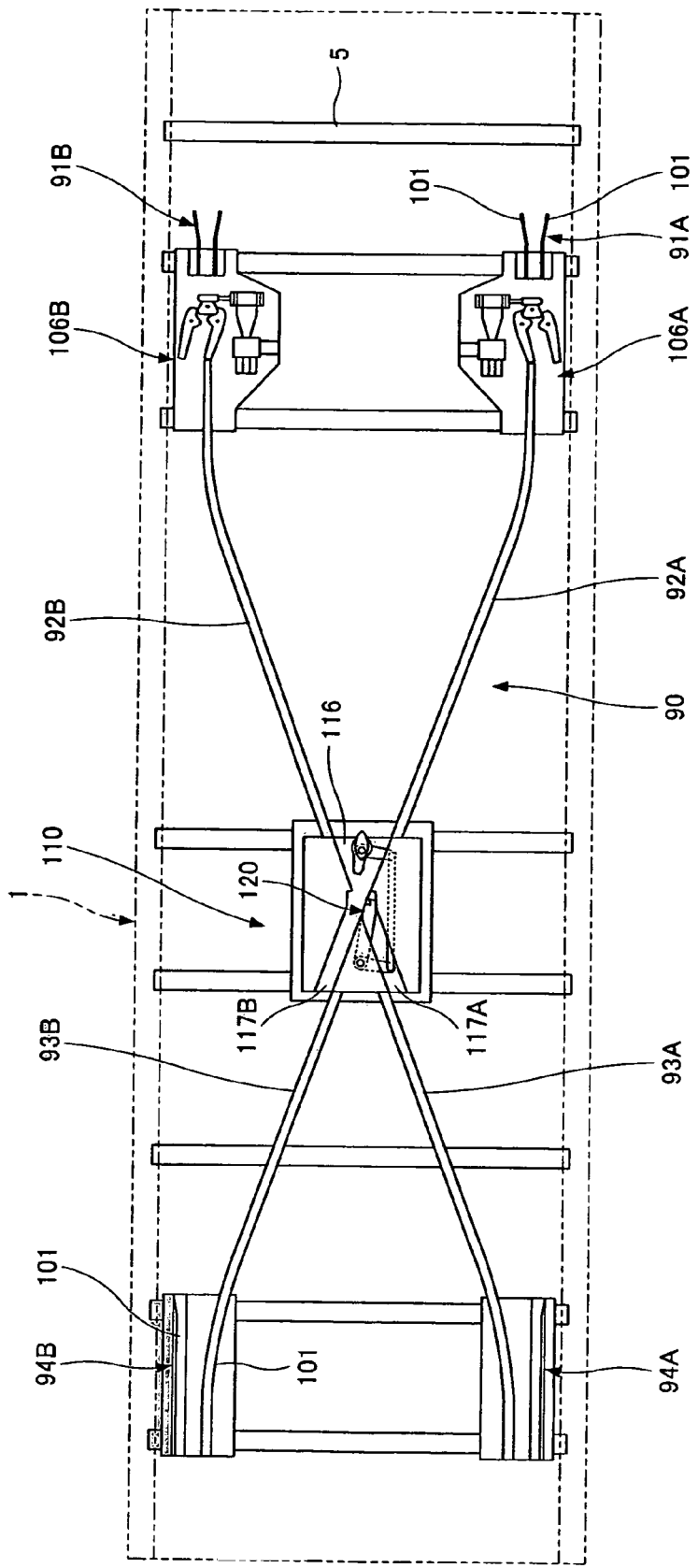
FIG. 6 is a schematic plan view illustrating a forward guiding device of the transfer system.
Figure 7:
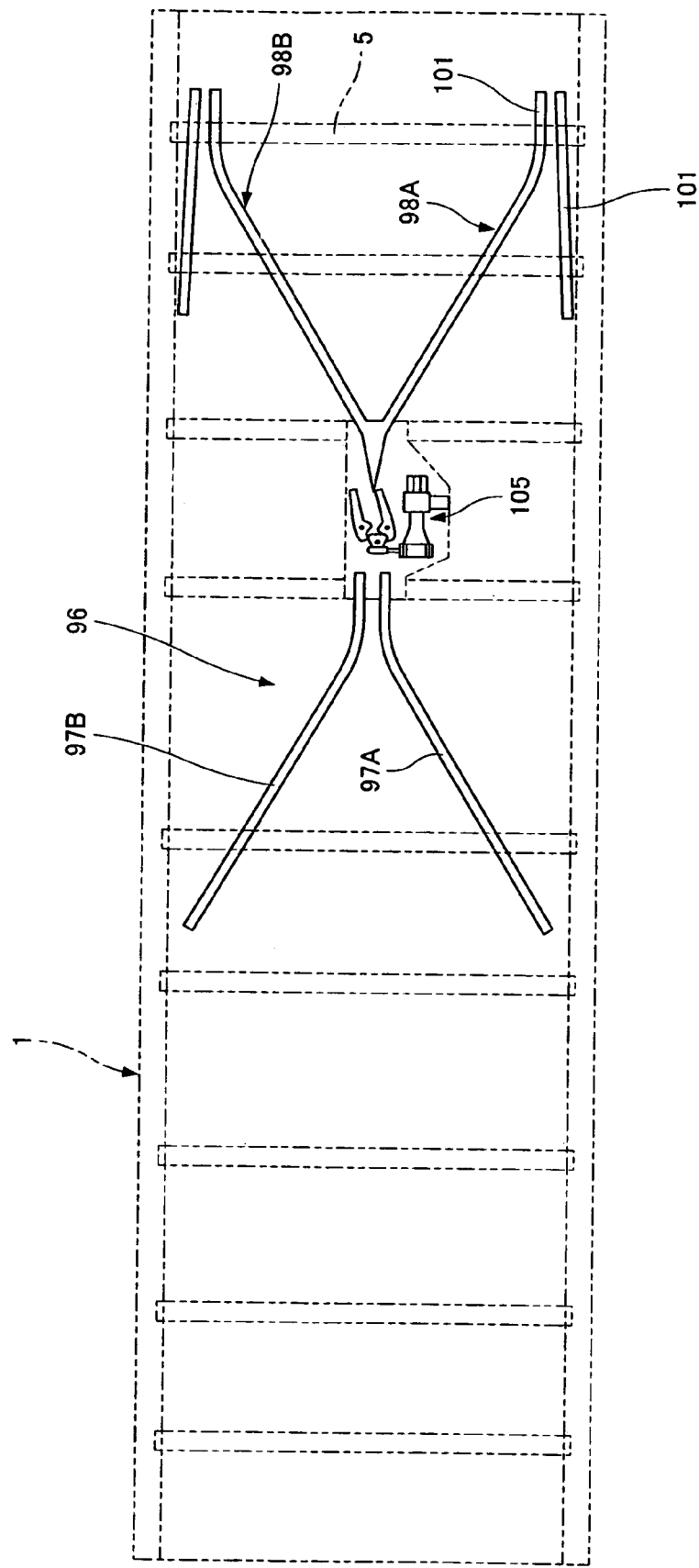
FIG. 7 is a schematic plan view illustrating a return guiding device of the transfer system.
Figure 8:
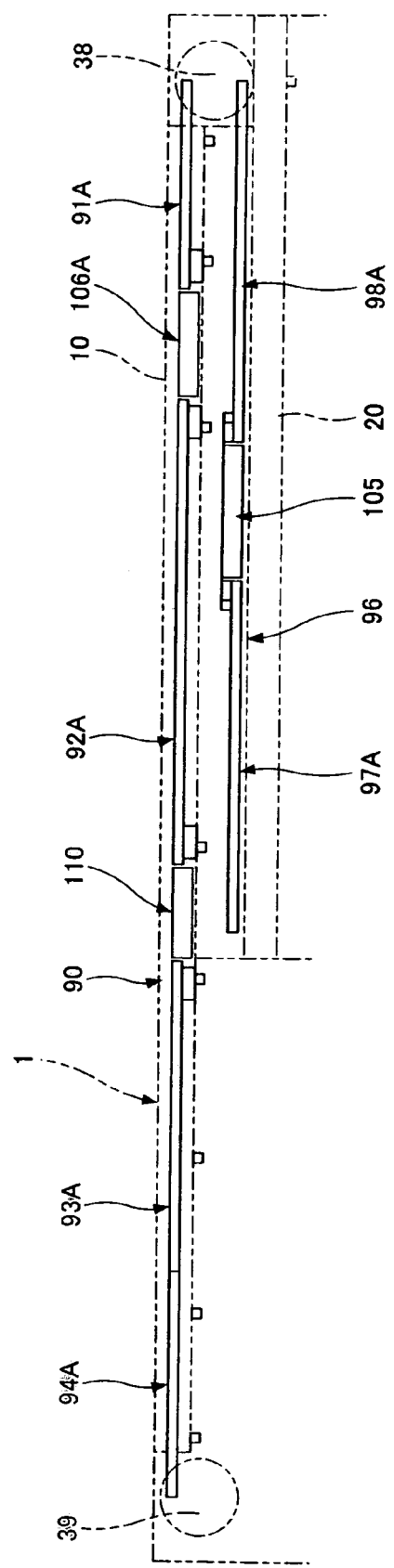
FIG. 8 is a schematic side view illustrating a group of guiding devices of the transfer system.
Figure 9:
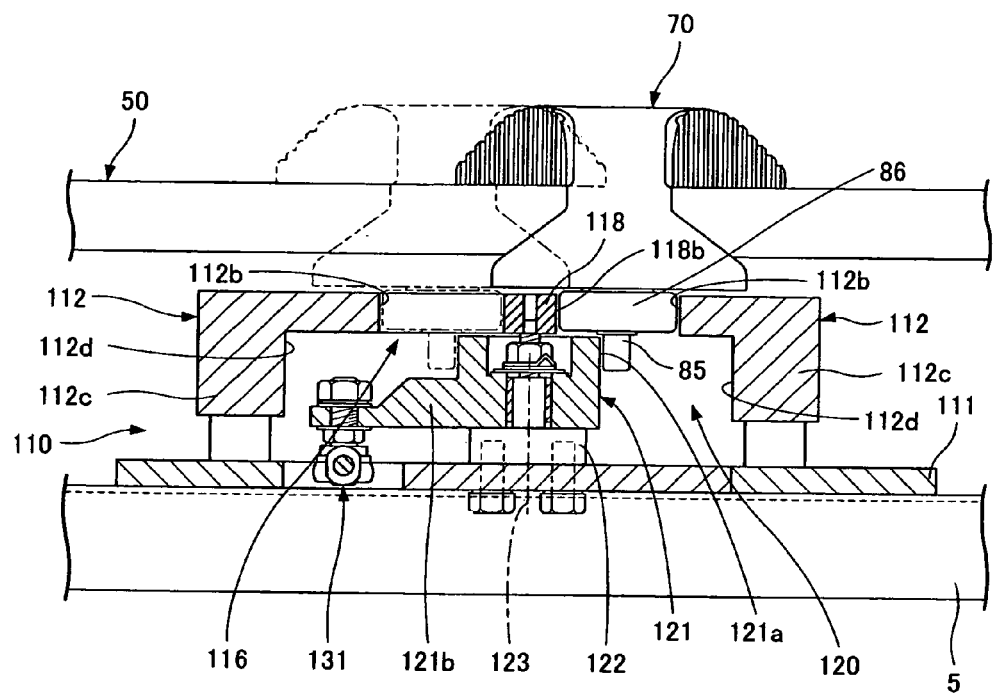
FIG. 9 is a vertical front sectional view of a portion of a merging guiding section of the upper change-over means in the transfer system.
Figure 10:
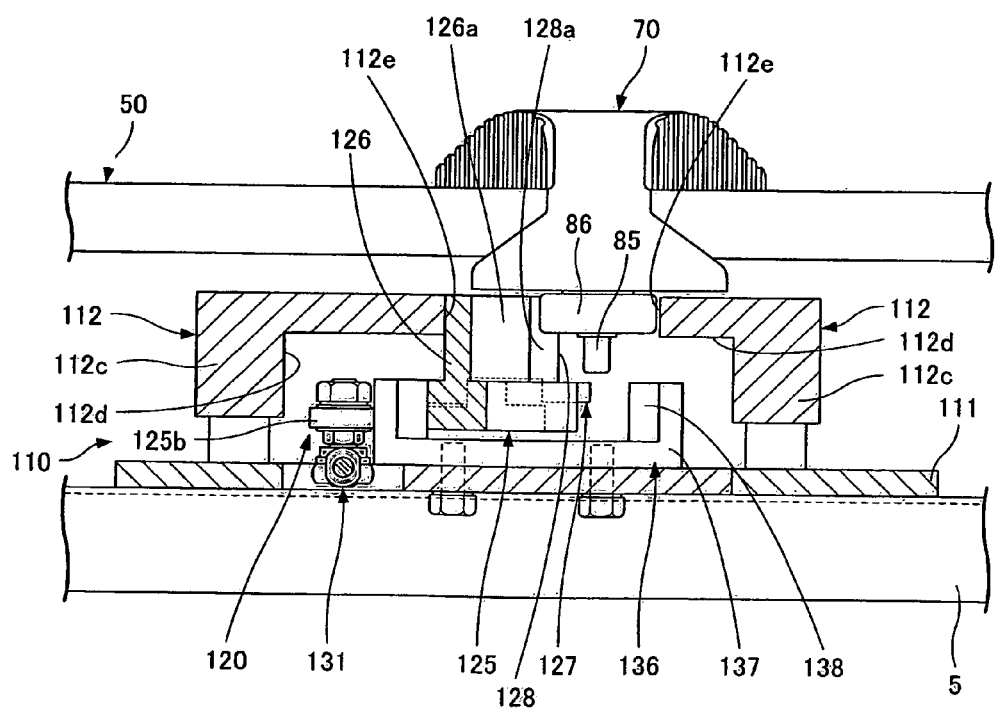
FIG. 10 is a vertical front sectional view of a guiding body portion of the upper change-over means in the transfer system.

As shown in FIG. 4, branch conveyors 146A, 146B forming branching paths 145A, 145B inclined outwardly and toward the lower side with respect to the main conveying path 45 are provided outwardly at both sides of the main frame 1. Those branch conveyors 146A, 146B are configured by supporting conveyor frames by a multiplicity of rollers. The conveyor frames or rollers are positioned by end sections thereof inside the step section 12 of the upper frame member 10 and disposed to be brought sufficiently close to the side plate section of the cover body 140. The upward dovetail grove 15 of the upper frame member 10, or the like, may be used for linking the branch conveyors 146A, 146B. The reference numeral 150 stands for an article.

The conveying and branching action of the article 150 in the above-described embodiment will be explained below.

Thus, the two endless chains 40 can be moved by actuating the electric motor 35 of the drive device 34 and forcibly rotating the sprocket 39 via the drive shaft 31 operably connected to the reducing mechanism 36. As a result of this movement of the two endless chains 40, the group of the article support bodies 50 are supported and guided by the upward support surfaces of the two guiding rail sections 18, 26 via the rotary body 64 and guided by the sidewise guiding surface of the top end extending section 29 or guiding rail section 18 via the side roller 65, thereby enabling the stable movement. Because the top end extending section 29 is positioned above the rotary body 64 at the return side, this rotary body 64 can be prevented from rising and the group of article support bodies 50 can be moved in a stable state without any play. As a result of such circulation movement of the group of the article support bodies 50, the articles 150 supplied on the group of the article support bodies 50 in the start end section can be conveyed on the main conveyor path 45.

During this conveying, the movement of both endless chains 40 in the forward path is performed below the cover body 140 and above the lubricating oil receiving section 13, and the movement of the two endless chains 40 in the return path is performed below the top end extending section 29 and above the lubricating oil receiving section 25.

When such conveying is carried out, the article side-push body 70 that moves integrally with the group of the article support bodies 50 is reciprocated in the lengthwise direction 51 of the article support bodies 50 or moved linearly along the main conveying path 45 together with the article support bodies 50 by guiding the guide rollers 86 thereof by the group of guiding devices 90, 96. This reciprocating movement of the article side-push body 70 is conducted with good stability at all times, without any play or significant changes in the posture (orientation), in a state where the article side-push body is mated with and guided by the guiding section 58 in the article support body 50 via the fitting section 79, that is, in a state where advantageous sliding friction has occurred.

Thus, for example, the guide roller 86 guided by the start end guiding section 91A on one side is guided linearly forward when the distribution means 106A is in a linear distribution posture and then guided by the finish end guiding section 94A after advancing linearly without receiving a guiding action. As a result, the article side-push body 70 does not act on the article 150, and the article 150 is conveyed in a linear advance form on the main conveying path 45. A similar movement is realized on the opposite side, and the guide roller 86 of the start end guiding section 91B moves from the distribution means 106B toward the finish end guiding section 94B.

Furthermore, the guide roller 86 that was guided by the start end guiding section 91A on one side is inclined and guided inwardly when the distribution means 106A is in the inclined distribution posture, then guided to the inner movement guiding section 92A, moved inwardly, then transferred to the outer movement guiding section 93B via the upper change-over means 110, guided by the outer movement guiding section 93B, moved to the outside and then guided by the finish end guiding section 94B. As a result, the group of the article side-push bodies 70 cross the main conveying path 45, while moving in the conveying direction, whereby the side-push action section 76 pushes the article 150 sidewise via the side-push abutment member 78 on the other side, and the article 150 is branched and moved in an inclined mode with respect to the main conveying path 45, while changing the orientation thereof, and transferred to the other branch conveyor 146B.

A similar movement is realized on the opposite side; the guide roller 86 of the start end guiding section 91B is guided by the distribution means 106B, inner movement guiding section 92B, upper change-over means 110, outer movement guiding section 93A, and finish end guiding section 94A, the side-push action section 76 of the group of article side-push bodies 70 pushes the article 150 sidewise via the side-push abutment member 78 on one side and transfers the article 150 to one branch conveyor 146A.

The guide rollers 86 that have thus reached the end sections of the finish end guiding sections 94A, 94B are guided and reversed by the reverse guiding bodies 108A, 108B. In the return guiding device 96, the guide rollers are first guided by the inner movement guiding sections 97A, 97B, then distributed to the left and right by the lower change-over means 105, and guided and moved to the outside by the outer movement guiding sections 98A, 98B. Then, they are guided by the reverse guiding bodies 107A, 107B and then transferred to any of the start end guiding sections 91A, 91B.

As described hereinabove, after the guide rollers 86 have been inclined and guided to the inside with the distribution means 106A, 106B of the inclination-like distribution posture and then guided with the inner movement guiding sections 92A, 92B and moved to the inside, the guide rollers are transferred to the outer movement guiding sections 93B, 93A via the upper change-over means 110, guided by the outer movement guiding sections 93B, 93A, and moved to the outside, they can be guided by the finish end guiding sections 94B, 94A, whereby the group of the article side-push bodies 70 are caused to cross the main conveying path 45, while moving in the conveying direction.

As the result, the side-push operation section 76 causes a side-push operation on the article 150, thereby the article 150 is branched and moved, and then distributed to the branch conveyors 146A, 146B.

In this case, the change-over operation of the upper change-over means 110 is carried out automatically by using the motion force of the roller shaft 85. Thus, for example, when the guide roller 86 is moved to the inside by guiding with one inner movement guiding section 92 and then transferred to the outer movement guiding section 93B via the upper change-over means 110, this upper change-over means 110 causes the cam body 121 to swing to the other side (right side) about the spindle center 123 on the upper side, as shown in FIG. 9 to FIG. 13, and causes the upper guiding body 126 and lower guiding body 128 to swing integrally with the long link body 125 and the short link body 127 to one side (left side) about the spindle center 130 on the lower side.

At this time, the side surface of the long link body 125 or the convex section 127c of the short link body 127 comes into contact with the buffer member 138. Furthermore, since the upper guiding surface 126a of one (left) upper guiding body 126 comes into contact with the step-shaped receiving surface 112e of the side section forming member 112, the other (right) upper guiding surface 126a is made linearly contiguous to one (abutting) front inclined surface 112b, the other (right) lower guiding surface 128a of the lower guiding body 128 is made linearly contiguous to the other (right) upper guiding surface 126a of the upper guiding body 126, and the lower guiding surface 128a is made linearly contiguous to the inclined surface 113a of the rear section forming member 113.

Therefore, the guiding roller 86 from the inner movement guiding section 92A located on one side (left side) moves to the outer movement guiding section 93B via the front inclined surface 112b, upper guiding surface 126a, lower guiding surface 128a, and inclined surface 113a, which are linearly contiguous, that is, through a branching guiding section 117B in the form of a linear groove, whereby the group of the article side-push bodies 70 are moved transversely from the left side to the right side in the main conveying path 45. In this case, as shown by a virtual line A in FIG. 13, the guide roller 86 that moves a portion of the cam body 121 is guided in a controlled manner by the front inclined surface 112b and control surface 118b, the roller shaft 85 thereof can be passed through without being brought into contact with the cam surface 121a, and the posture of the upper guiding body 126 or lower guiding body 128 can thus be maintained.

Furthermore, when the guide roller 86 is introduced into the start end guiding section 91B on the other side (right side) by an operation of the lower change-over means 105 and changed over so as to be guided from the distribution means 106B to the inner movement guiding section 92B, as shown in FIG. 13, once the guide roller 86 located at the rearmost end from the inner movement guiding section 92A on one side (left side) has reached a portion of the lower guiding surface 128a of the lower guiding body 128, the guide roller 86 located at the front most end from the inner movement guiding section 92B on the other side (right side) reaches the merging guiding section 116, and the roller shaft 85 thereof is in a position with close proximity to (abuts against) the cam surface 121a.

Figure 14:
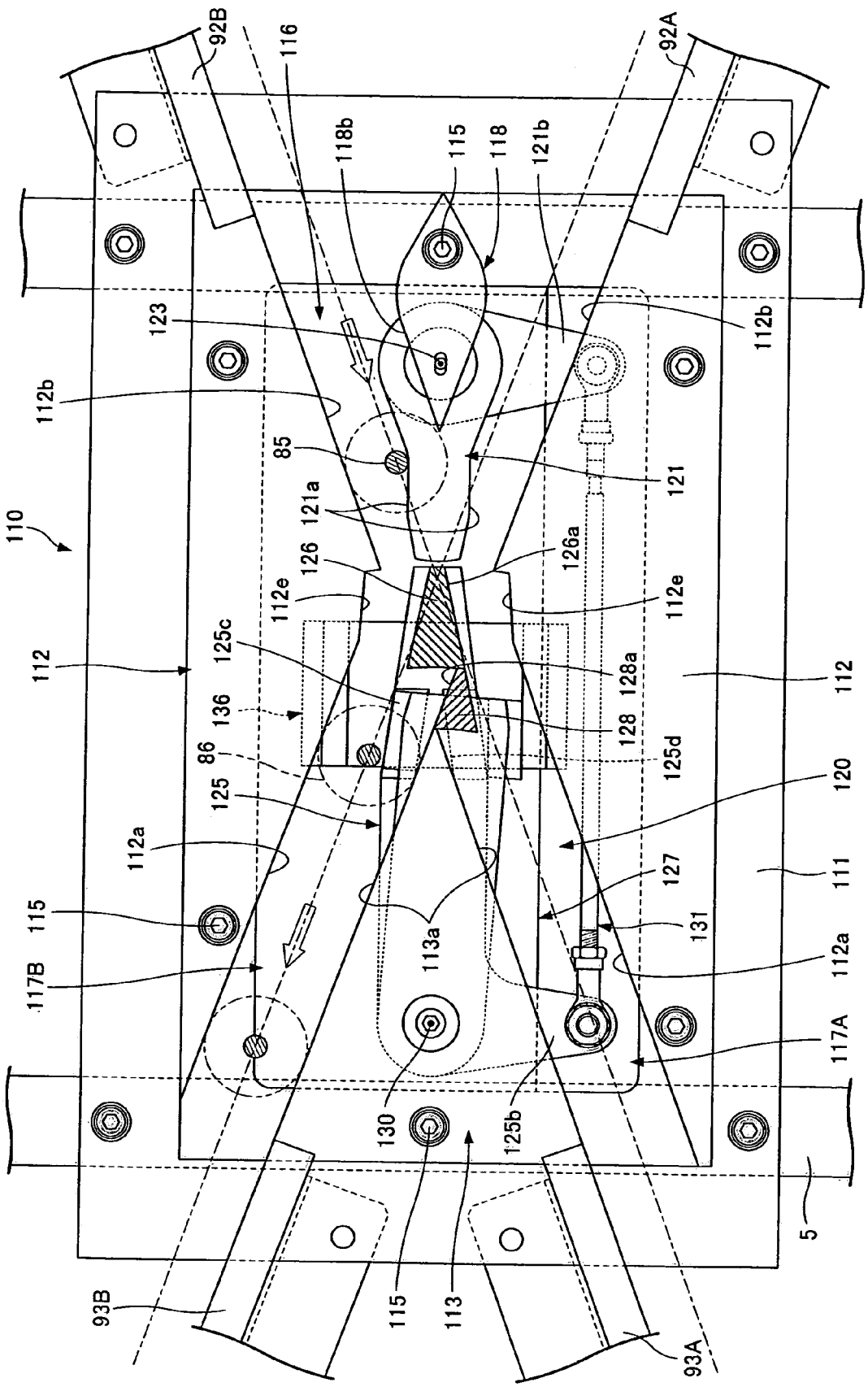
FIG. 14 is a partially cut-out plan view of the upper change-over means in the transfer system, illustrating a state during which the change-over of the means is performed.

If the group of article support bodies 50 moves from this state, the roller shaft 85 comes into contact with the cam surface 121a, the cam body 121 is pushed to the opposite side (left side) by the motion force of the roller shaft 85, and the cam body 121 is swung to the left about the spindle center 123 located on the upper side, as shown in FIG. 14. The swinging movement of the cam body 121 is transferred to the long link body 125 via the arm section 121b, arm-shaped body 132, rod-shaped body 134, arm-shaped body 133, and arm section 125b, and the long link body 125, that is, the upper guiding body 126, is swung to the right side about the spindle center 130 on the lower side. At this time, in the first half of the change-over operation of the upper guiding body 126, only the long link body 125 swings through the predetermined length L obtained by subtracting the stopper section width 125w from the mating section width 127w, and because the short link body 127 does not swing, the lower guiding body 128 does not swing to the right even if the upper guiding body 126 swings to the right, whereby the guide roller 86 are the rearmost end is guided by the lower guiding body 128 smoothly, without any impediments.

If the group of the article support bodies 50 further moves, the cam body 121 is continuously pushed to the opposite side (to the left) by the motion force of the roller shaft 85 and, as described hereinabove, the upper guiding body 126 is further swung to the right about the spindle center 130 on the lower side via the swinging movement response mechanism 131. In this process, the set length L is absorbed (the long link body 125 swings through the set length L), and the stopper section 125d comes into contact with the convex section 127c. Therefore, in the second half of the change-over action of the upper guiding body 126, that is, in the subsequent interval, the long link body 125 and short link body 127 are swung integrally about the spindle center 130 on the lower side.

Figure 15:
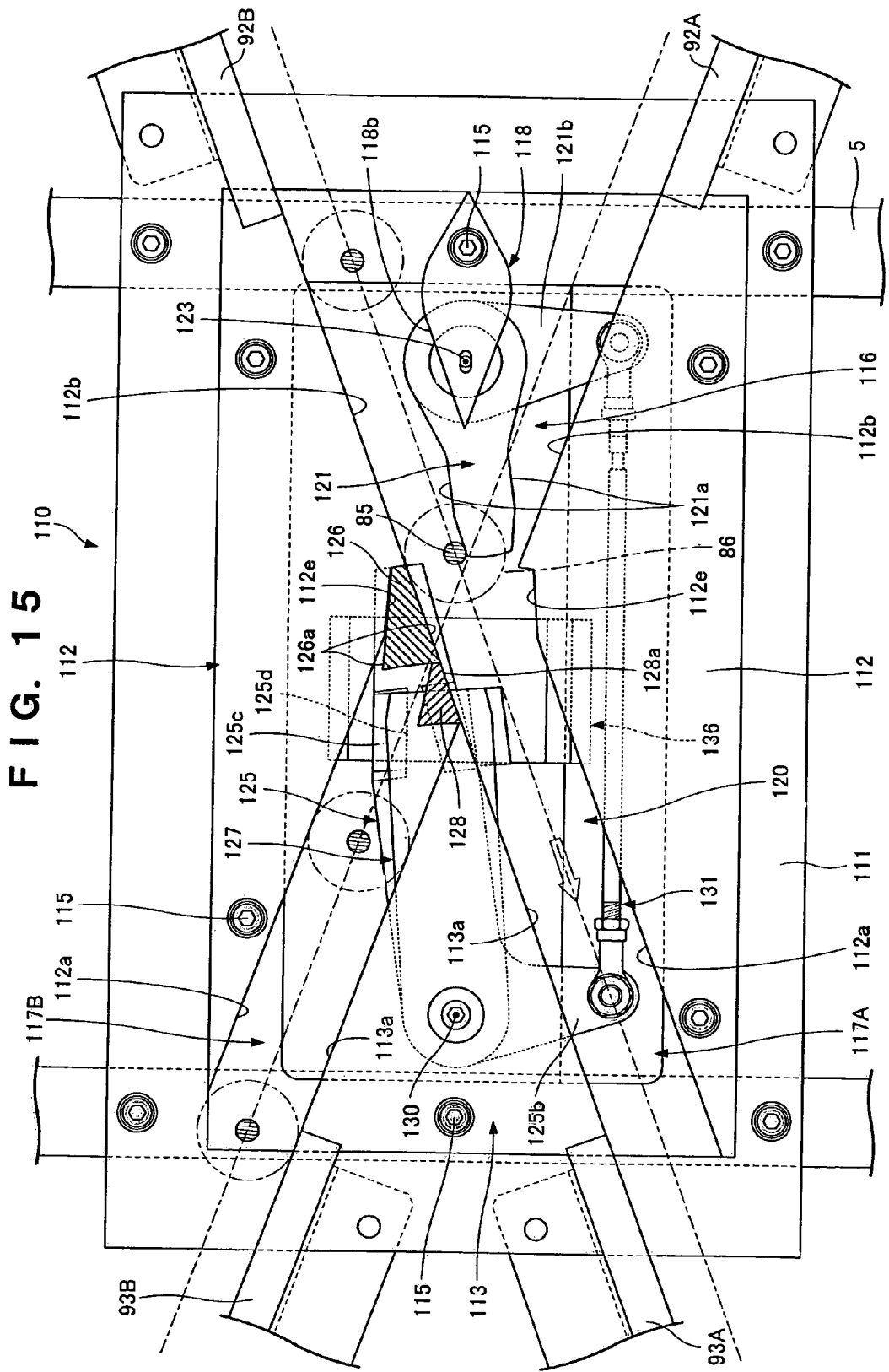
FIG. 15 is a partially cut-out plan view of the upper change-over means in the transfer system, illustrating a state immediately after the change-over of the means.

As a result, as shown in FIG. 15, the other (right) upper guiding surface 126a of the upper guiding body 126 comes into contact with a step-shaped receiving surface 112e of the side section forming member 112, whereby one (left) upper guiding surface 126a is made linearly contiguous to the front inclined surface 112b on the other (abutting) side, one (left) lower guiding surface 128a of the lower guiding body 128 is made linearly contiguous to one (left) upper guiding surface 126a of the upper guiding body 126, and the lower guiding surface 128a is made linearly contiguous to the inclined surface 113a of the rear section forming member 113.

Therefore, the guide roller 86 at the frontmost end from the inner movement guiding section 92B on the other side (right side) moves to the outer movement guiding section 93A via the front inclined surface 112b, upper guiding surface 126a, lower guiding surface 128a, and inclined surface 113a, which are linearly contiguous, that is via the branching guiding section 117A in the form of a straight groove, whereby the group of the article side-push bodies 70 are moved transversely from the right side to the left side in the main conveying path 45.

In this process, when the moving roller shaft 85 reaches the finish end portion of the cam surface 121a in the cam body 121, the guide roller 86 mounted on this roller shaft 85 faces the upper guiding surface 126a of the upper guiding body 126. As a result, the guide roller 86 prevents the cam body 121 from being shifted, e.g., by impacts occurring when the roller shaft 85 is separated form the cam surface 121a, and the upper guiding body 126 from being separated from the step-shaped receiving surface 112e, thereby making it possible to move the guide roller 86 smoothly at all times.

As described hereinabove, a sufficient change-over guiding length in the upper change-over means 110 can be ensured by the contiguity of the upper guiding surface 126a of the upper guiding body 126 and the lower guiding surface 128a of the lower guiding body 128, and the change-over of the upper guiding body 126 and lower guiding body 128 can be conduced smoothly at all times.

In the above-described embodiment, a configuration employing a forward guiding device 90 as a guiding device was explained, but a configuration employing a return guiding device may be also employed.

In the above-described embodiment, a configuration was explained in which the cam body 121 was swung by the motion force of the support shaft (roller shaft 85), but a configuration in which the cam body is swung by the motion force of the guided body (guide roller 86) or a configuration in which the cam body is swung by the motion force of another member from the side of the article side-push body 70 may be also employed.

In the above-described embodiment, a configuration was explained in which a guided body (guide roller 86) guided by the guiding devices 90, 96 on the side of the main frame 1 on the underside of the article side-push body 70 was mounted on the protruding lower section of the support shaft (roller shaft 85) provided in a hanging condition by embedding the upper section of the guided body for support in the central section of the guided section 97, but a configuration in which the guided body is mounted on the support shaft section provided integrally in a hanging condition from the lower section of the article side-push body 70 may be also employed.

In the above-described embodiment, a configuration was explained in which an endless chain 40 was employed as an endless rotary body and the protruding sections were constituted by long link pins formed by causing the predetermined link pins, from the group of link pins 42, which link the links 41, to protrude inwardly, but a configuration in which protruding sections are formed in the predetermined locations of the endless chain 40 or a configuration using an endless belt with protruding sections formed in the predetermined locations may be also used.

In the above-described embodiment, a configuration was explained in which a shaped rail opened at the lower surface side was used as the article support body 50, and a configuration in which the rail is not opened may be also used.

In the above-described embodiment, a configuration was explained in which the upper frame member 10 and lower frame member 20 were separate bodies, but a configuration in which the lower frame member 20 is a side plate or a side frame may be also used.

In the above-described embodiment, the side-push abutment member 78 was mounted with an inclination at an angle θ of 30 degrees, but this inclination angle may be set arbitrarily.

What is claimed is:

1. A transfer system comprising:
a pair of left and right endless rotary bodies provided along a main conveying path;
a plurality of article support bodies mounted between the endless rotary bodies and having a direction perpendicular to the main conveying path as a lengthwise direction thereof; and
an article side-push body fitted around the article support body and guided thereby, wherein
a guided body is mounted on an underside of the article side-push body, and
a guiding device is installed at a main frame, for guiding the guided body,
the guiding device comprising a pair of left and right inner movement guiding sections more inclined inwardly on the lower side, and a pair of left and right outer movement guiding sections more inclined outwardly on the lower side and facing finish ends of the inner movement guiding sections via a change-over unit,
the change-over unit including a merging guiding section for receiving the guided body from both inner movement guiding sections, a branching guiding section for guiding the guided body to both outer movement guiding sections, and a change-over guiding section for distributing a guided body from the merging guiding section to one of a pair of branching guiding sections,
the change-over guiding section including an upper guiding body and a lower guiding body, said upper guiding body and said lower guiding body each being movable relative to said merging guiding section during a change-over action and together guiding the guided body from the merging guiding section to said one of said branching guiding sections, wherein a motion force of the article side-push body along the main conveying path causes the upper guiding body to perform a change-over action that moves said upper guiding body relative to said merging guiding section and causes the lower guiding body to integrally perform a change-over action during a second half of the change-over action of the upper guiding body that moves said lower guiding body relative to said merging guiding section.

2. The transfer system according to claim 1, wherein when the guided body of a leading article side-push body is guided by the lower guiding body, a following article side-push body assumes a start position for causing the upper guiding body to perform a change-over action.

3. The transfer system according to claim 1, wherein the change-over guiding section comprises:
a cam body positioned in the merging guiding section to be swingable to the left and right about a spindle center on an upper side thereof,
an upper guiding body and a lower guiding body being swingable to the left and right about the spindle center on a lower side thereof, and
a swinging response movement mechanism provided between the cam body and the upper guiding body, wherein the cam body is caused to swing to the left and right by a motion force of the article side-push body and the upper guiding body changes over in response to the left-right swinging of the cam body.

4. The transfer system according to claim 1, wherein a support shaft is provided vertically on the underside of the article side-push body, the guided body is mounted on the support shaft, and the upper guiding body is caused to perform the change-over action by a motion force of the guided body that has moved to the merging guiding section.

5. The transfer system according to claim 3, wherein a support shaft is provided vertically on the underside of the article side-push body, the guided body is mounted on the support shaft, and the cam body is caused to swing to the left and right by a motion force of the moving support shaft.

6. The transfer system according to claim 5, wherein when the moving support shaft reaches a finish end section of the cam body, the guided body mounted on the support shaft faces the upper guiding body.

* * * * *